(12) United States Patent
Rahmathullah et al.

(10) Patent No.: US 11,942,653 B2
(45) Date of Patent: Mar. 26, 2024

(54) HOUSING WITH INTEGRATED SPARK ARRESTOR

(71) Applicant: Donaldson Company, Inc., Minneapolis, MN (US)

(72) Inventors: Aflal Rahmathullah, Savage, MN (US); Daniel J. Dotzler, Webster, MN (US); James P. Moorman, Eden Prairie, MN (US); Jacob L. Sanders, Apple Valley, MN (US)

(73) Assignee: Donaldson Company, Inc., Bloomington, MN (US)

( * ) Notice: Subject to any disclaimer, the term of this patent is extended or adjusted under 35 U.S.C. 154(b) by 268 days.

(21) Appl. No.: 17/192,283

(22) Filed: Mar. 4, 2021

(65) Prior Publication Data

US 2021/0280941 A1 Sep. 9, 2021

Related U.S. Application Data

(60) Provisional application No. 62/985,211, filed on Mar. 4, 2020.

(51) Int. Cl.
*H01M 50/383* (2021.01)
*H01M 50/30* (2021.01)
*H01M 50/325* (2021.01)

(52) U.S. Cl.
CPC ....... *H01M 50/383* (2021.01); *H01M 50/325* (2021.01); *H01M 50/394* (2021.01)

(58) Field of Classification Search
None
See application file for complete search history.

(56) References Cited

U.S. PATENT DOCUMENTS

| | | | |
|---|---|---|---|
| 4,250,232 A | 2/1981 | Davidson | |
| 4,484,690 A | 11/1984 | Nash | |
| 4,678,726 A | 7/1987 | Buder et al. | |
| 4,916,034 A | 4/1990 | Hulsebus et al. | |
| 5,856,037 A | 1/1999 | Casale et al. | |
| 5,981,099 A * | 11/1999 | Bourbeau | H01M 50/394 |
| | | | 429/82 |
| 6,846,591 B1 | 1/2005 | Crowe et al. | |
| 8,273,485 B2 | 9/2012 | Schaevitz et al. | |
| 8,792,658 B2 | 7/2014 | Baliga et al. | |
| 9,059,482 B2 | 6/2015 | Okamoto et al. | |
| 9,735,408 B2 | 8/2017 | Kim et al. | |
| 9,806,312 B2 | 10/2017 | Li et al. | |
| 9,850,000 B2 | 12/2017 | Tweet et al. | |
| 10,333,119 B2 | 6/2019 | Partington et al. | |

(Continued)

FOREIGN PATENT DOCUMENTS

RU 175674 12/2017

OTHER PUBLICATIONS

Robert et al. (WO 2011103 16) (a raw machine translation) (Abstract) (Jun. 10, 2021) (Year: 2021).*

(Continued)

*Primary Examiner* — Carmen V Lyles-Irving
(74) *Attorney, Agent, or Firm* — Mueting Raasch Group (57) ABSTRACT

A battery housing has a plurality of housing sidewalls defining an enclosure, where a first housing sidewall of the plurality of housing sidewalls defines a plurality of openings cumulatively defining a valve opening. The housing defines a valve coupling structure around the valve opening.

18 Claims, 7 Drawing Sheets

(56) References Cited

U.S. PATENT DOCUMENTS

2016/0093842 A1    3/2016   Blanco et al.
2018/0287127 A1   10/2018   Onnerud et al.
2019/0379018 A1   12/2019   Varatharajah et al.
2021/0193981 A1*   6/2021   Emery ................ H01M 50/394
2021/0313581 A1*  10/2021   Urata ................... H01M 4/622

OTHER PUBLICATIONS

Robert et al. (WO 201110316) (a raw machine translation) (Detailed Description) (Jun. 10, 2021) (Year: 2021).*
Robert et al. (WO 201110316) (a raw machine translation) (Drawings) (Jun. 10, 2021) (Year: 2021).*

* cited by examiner

HOUSING WITH INTEGRATED SPARK ARRESTOR

CROSS REFERENCE TO RELATED APPLICATIONS

This application claims the benefit of U.S. Provisional Application No. 62/985,211, filed 4 Mar. 2020, the disclosure of which is incorporated by reference herein in its entirety.

TECHNOLOGICAL FIELD

The present disclosure is generally related to a housing. More particularly, the present disclosure is related to a housing with an integrated spark arrestor.

SUMMARY

In some embodiments, the present technology relates to a battery housing. The battery housing has a plurality of housing sidewalls defining an enclosure. A first housing sidewall of the plurality of housing sidewalls defines a plurality of openings cumulatively defining a valve opening. The first housing sidewall is constructed of metal. The first housing sidewall defines a valve coupling structure around the valve opening.

In some such embodiments, the valve coupling structure has a plurality of bayonet connector openings around the valve opening. Additionally or alternatively, the valve coupling structure has an opening extending entirely through a thickness of the first housing sidewall. Additionally or alternatively, the coupling structure extends no more than partially through a thickness of the first housing sidewall. Additionally or alternatively, the first housing sidewall has a first face within the enclosure and a second face opposite the first face, where the second face is outside of the enclosure, and the valve opening is positioned between the first face and the coupling structure. Additionally or alternatively, the first housing sidewall has a first face within the enclosure and a second face opposite the first face, wherein the second face is outside of the enclosure, and each of the valve opening and the coupling structure extend through the first face and the second face. Additionally or alternatively, the valve coupling structure has a screw thread defined by the first housing sidewall around the valve opening. Additionally or alternatively, each of the plurality of openings have a maximum opening dimension of no more than 3 mm. Additionally or alternatively, the plurality of openings has at least 5 openings.

In some embodiments, the present technology relates to a vented system. The vented system has a battery housing has a plurality of housing sidewalls defining an enclosure. A first housing sidewall of the plurality of housing sidewalls defines a plurality of openings cumulatively defining a valve opening. The housing further defining a coupling structure around the valve opening. The vented system has a valve. The valve has a valve body having a mating structure coupled to the coupling structure. The valve body defines an airflow pathway from the valve opening to an outside environment. A film is coupled to the valve body, where the film is disposed across the airflow pathway. A seal is compressed between the first housing sidewall and the valve body around the valve opening.

In some such embodiments, the seal is disposed around the mating structure. Additionally or alternatively, the coupling structure and the mating structure define a threaded connection. Additionally or alternatively, the coupling structure and the mating structure define a bayonet connection. Additionally or alternatively, the valve body has a puncturing member extending towards the film. Additionally or alternatively, the each of the plurality of openings have a maximum opening dimension of no more than 3 mm. Additionally or alternatively, the valve coupling structure has a screw thread defined by the first housing sidewall around the valve opening. Additionally or alternatively, the first housing sidewall has a first face within the enclosure and a second face opposite the first face, where the second face is outside of the enclosure, and the valve opening is positioned between the first face and the coupling structure. Additionally or alternatively, the film is ePTFE.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
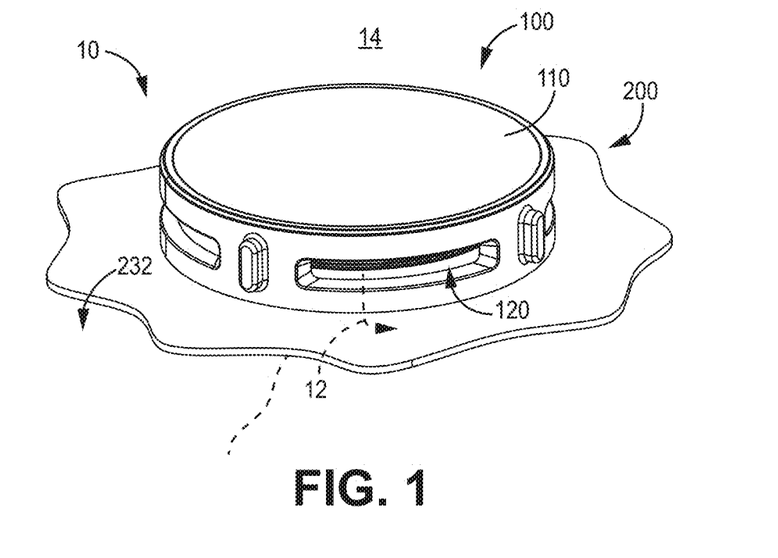
FIG. 1 depicts a perspective view of an example system consistent with the present technology.
Figure 9:
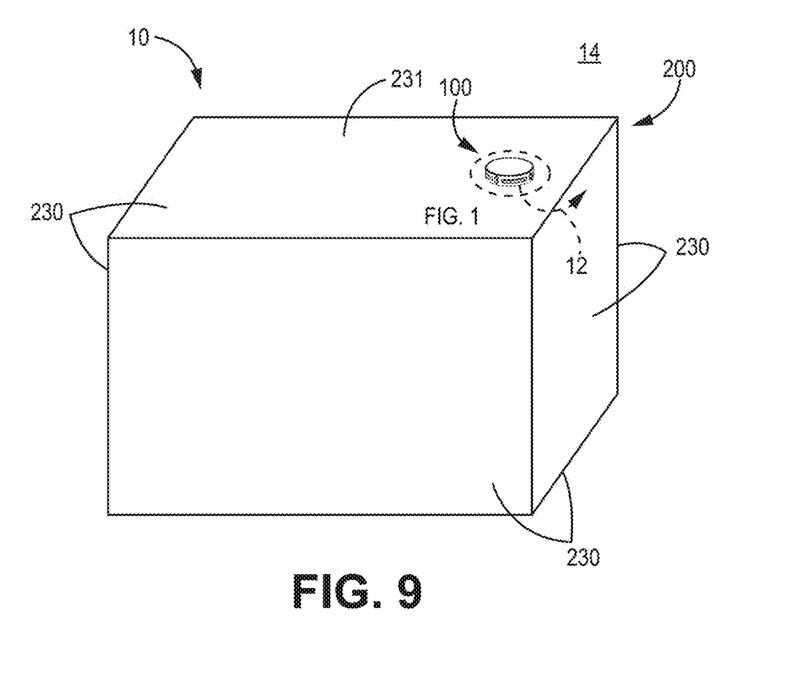
FIG. 9 is a perspective view of an example system consistent with embodiments.

FIG. 9 is a perspective view of an example system 10 consistent with embodiments, and FIG. 1 is a detail view of FIG. 9. FIG. 9 depicts a system 10 having a housing 200 and a valve assembly 100. The housing 200 can be a battery housing in various embodiments. The housing 200 has a plurality of sidewalls 230 defining an enclosure 232. A valve assembly 100 is coupled to a first sidewall 231 of the plurality of sidewalls 230. The valve assembly 100 has a valve body 110 defining an airflow pathway 12 between the enclosure 232 and the outside environment 14. In some embodiments the airflow pathway 12 allows constant gaseous communication between the enclosure 232 and the outside environment 14. In some embodiments the airflow pathway 12 defines selective communication between the enclosure and the outside environment 14. In various embodiments the enclosure 232 is isolated from the outside environment 14 except through the airflow pathway 12. While this example depicts one housing sidewall 231 as having a valve assembly 100, in some embodiments multiple housing sidewalls can each have a valve assembly.

Figure 2:
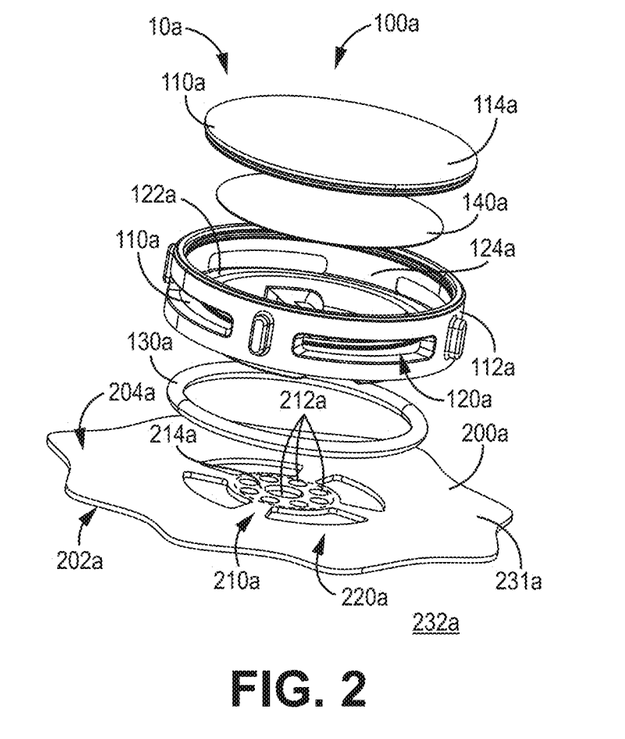
FIG. 2 is an exploded view of an example system 10a consistent with FIG. 1.
Figure 4:
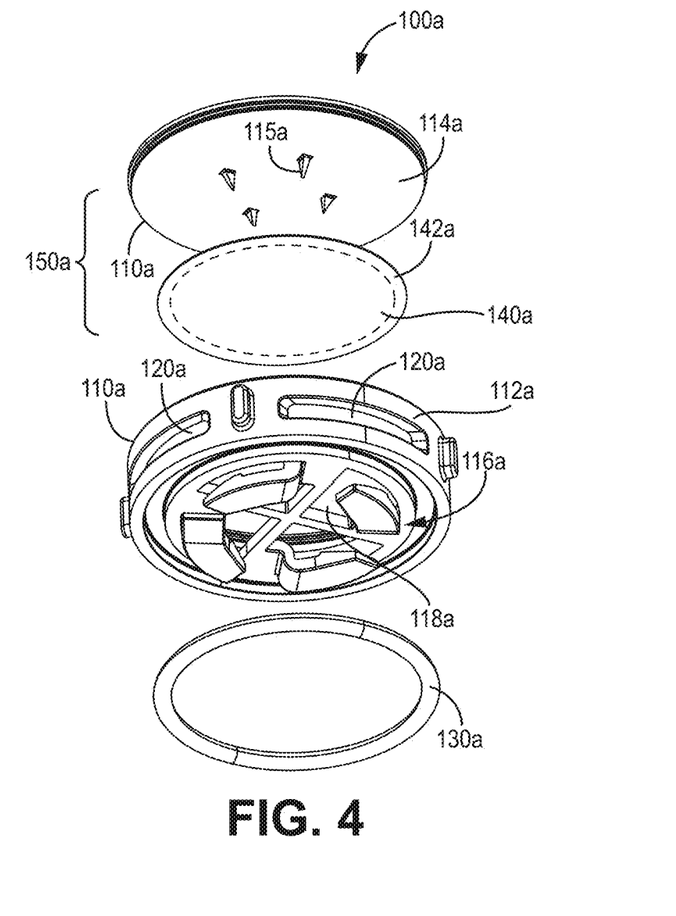
FIG. 4 is an exploded view of an example valve assembly consistent with some embodiments.
Figure 5:
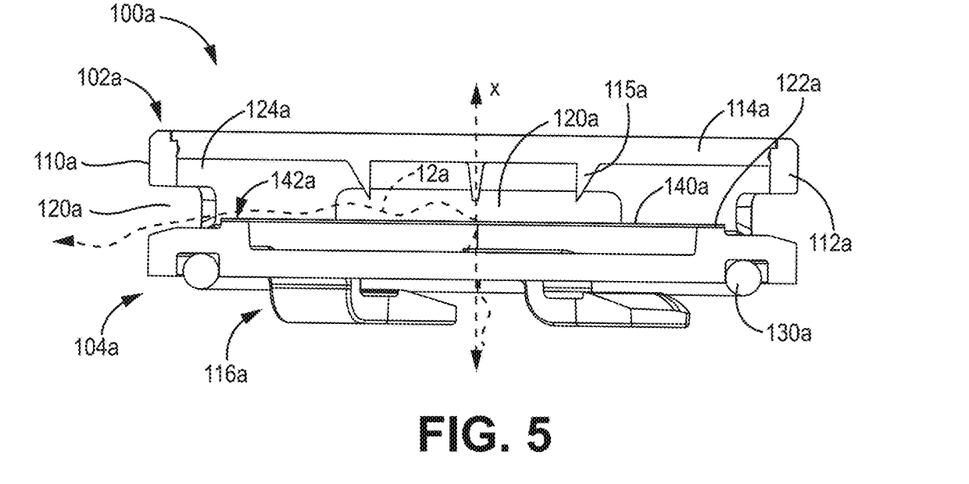
FIG. 5 is a cross-sectional view of the example valve assembly of FIG. 4.
Figure 6:
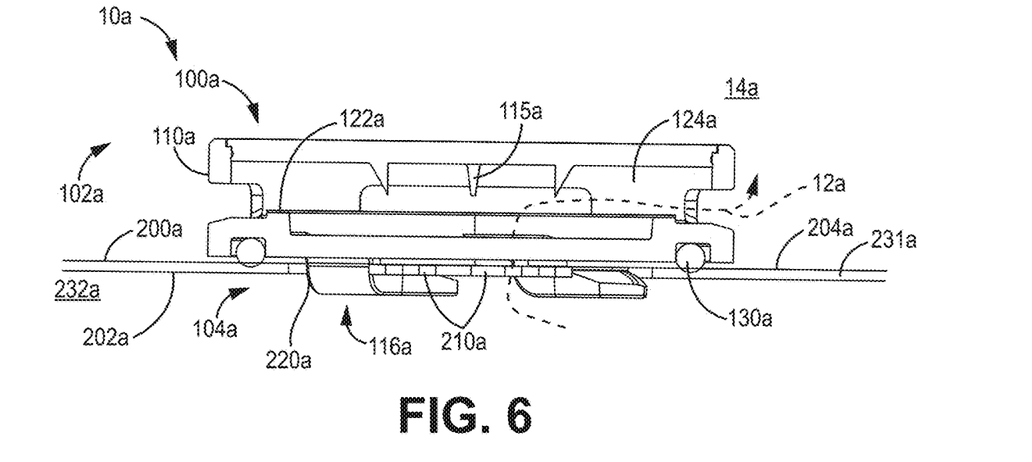
FIG. 6 is a cross-sectional view of a first example system consistent with FIG. 1.

FIG. 2 is an exploded view of an example system 10a consistent with FIGS. 1 and 9, where the housing 200a and the valve assembly 100a have a particular construction. FIG. 4 is an exploded view of the example valve assembly 100a, FIG. 5 is a cross-sectional view of the example valve assembly 100a, and FIG. 6 is a cross-sectional view of the example system 10a of FIG. 2. The system 10a is generally configured to allow gases to pass between the enclosure 232a of the housing 200a and the outside environment 14 through the valve assembly 100a under normal conditions.

As discussed above with reference to FIGS. 1 and 9, the valve assembly 100a is configured to couple to a first sidewall 231a of the plurality of sidewalls of the housing 200a, which is best visible in FIG. 2 for the present discussion. The housing 200a defines a plurality of openings 212a cumulatively defining a valve opening 210a. Having a valve opening 210a defined by a plurality of openings 212a allows the structure of the housing 200a itself, and in particular the first sidewall 231a, to form a physical barrier 214a across the valve opening 210a. The physical barrier 214a can serve as a spark arrestor in some embodiments where the components within the housing can generate sparks. As such, the physical barrier 214a may reduce the likelihood of a spark reaching various components of the valve assembly 100a. Integrating the physical barrier 214a in the structure of the housing 200 advantageously reduces the likelihood that the physical barrier 214a would be detached from the rest of the housing 200 when the system is under stress, such as under a thermal runaway event. In various embodiments the first sidewall 231a and, therefore, the physical barrier 214a across the valve opening 210a is constructed of metal to reduce the likelihood of the physical barrier 214a melting during a high temperature event.

The valve opening 210a can be characterized by a percent open area that is a ratio of the area of the valve opening 210a relative to the area of the portion of the first sidewall 231a defining the valve opening 210a, where the portion of the first sidewall 231a defining the valve opening 210a is denoted in broken lines in FIG. 2. Explained differently, the percent open area is the ratio of the area of the plurality of openings 212a relative to the sum of (1) the area of the plurality of openings 212a and (2) the area of the physical barrier 214a across the valve opening 210a. The percent open area can range from 10-90%, 10-50%, 40-60%, 25-75%, 50-90%, 60-80%, and 75-90%, as examples. In various embodiments, each of the plurality of openings 212a has a maximum opening dimension, such as a diameter or a length of a diagonal, of no more than 5 mm. In some embodiments the maximum opening dimension is no more than 4 mm or even 3 mm. In a variety of embodiments the plurality of openings comprises at least 5 openings.

The housing 200a defines a valve coupling structure 220a. The valve coupling structure 220a is generally configured to sealably engage a valve assembly 100a. The valve coupling structure 220a is defined around the valve opening 210a which is, as discussed above, defined by a plurality of openings 212a in the housing 200a. In the current example, the valve coupling structure 220a is a plurality of bayonet connector openings around the valve opening 210a. Each bayonet connector opening extends entirely through the thickness of the first sidewall 231a. The first sidewall 231a defines a first face 202a within the enclosure 232a and a second face 204a outside of the enclosure 232a. The second face 204a is opposite the first face 202a. The valve coupling structure 220a extends through the first face 202a and the second face 204a. In this example, each bayonet connector opening is a discrete segment of an annulus. The first housing sidewall 231a angularly separates each bayonet connector opening.

The valve assembly 100a has a valve body 110a and a release valve 150a (FIG. 4) coupled to the valve body 110a. The valve body 110a is generally configured to house the release valve 150a. The valve body 110a has a valve sidewall 112a and an endcap 114a. The valve sidewall 112a extends in the axial direction around the release valve 150a. The valve sidewall 112a extends axially between a housing seal 130a and the endcap 114a.

The release valve 150a is generally configured to allow gases from inside the housing 200a to escape to the outside environment 14a when the environment inside the housing 200a undergoes a relative pressure spike. Upon a pressure event inside the housing 200a that reaches a first threshold pressure, the release valve 150a is configured to open. In some embodiments the release valve 150a opens irreversibly. In some embodiments the release valve 150a opens reversibly, meaning that the release valve 150a returns to a closed position once the pressure inside the housing lowers to a second threshold pressure.

In the current example, the release valve 150a has a film 140a that is coupled to the valve body 110a. Under normal pressure conditions, the film 140a is generally, although not necessarily perfectly, planar. Upon a pressure spike within the housing 200a above a threshold T, the pressure expands the film 140a towards a puncturing member 115a extending downwardly from the end cap 114a until the puncturing member 115a punctures the film 140a. This allows gas to pass through the film 140a relatively quickly and exit the housing 200a through the ambient-side opening 120a. Other release valve configurations are contemplated, however. In some embodiments a film such as the one described can be configured to burst without a puncturing member. In some embodiments an umbrella valve can form the release valve.

Figure 11:
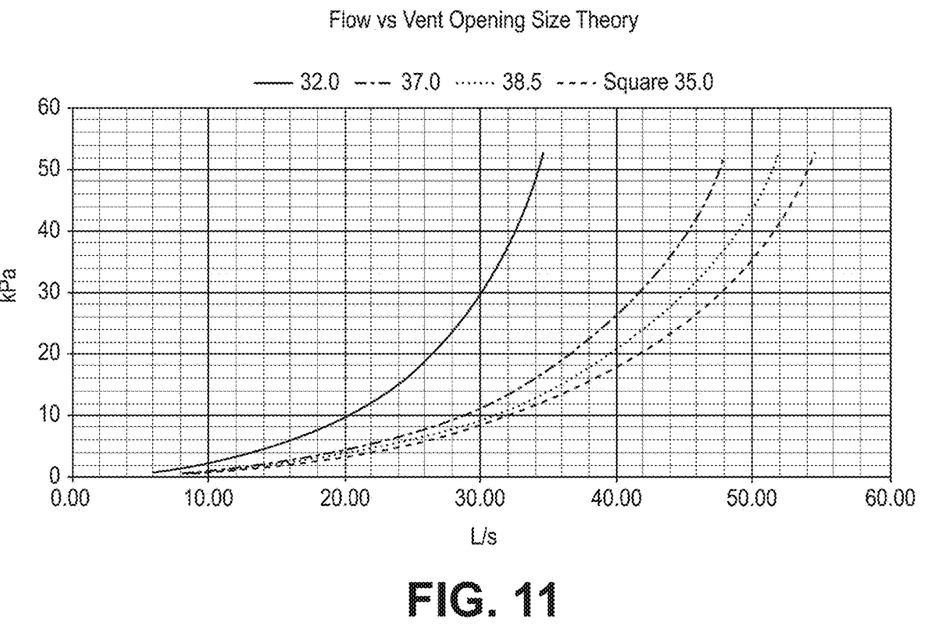
FIG. 11 is graph demonstrating the theoretical relationship between the pressure differential between the housing the outside environment with airflow through the housing based on the size of the vent opening in the housing.

Upon puncturing of the film 140a, the airflow through the plurality of openings 212a is generally related to (1) the pressure differential between the housing and the ambient environment and (2) the total flow area defined by the plurality of openings 212a. FIG. 11 is graph demonstrating this theoretical relationship, where the total flow areas considered are consistent with a 32.0 mm diameter opening (having a total flow area of 804.25 mm$^2$), a 37 mm diameter opening (having a total flow area of 1075.2 mm$^2$), a 38.5 mm diameter opening (having a total flow area of 1164.2 mm$^2$), and a square having 35.0 mm sides (having a total flow area of 1225.0 mm$^2$). The total flow area can be considered the sum of the areas of each of the plurality of openings in addition to any other openings that are unobstructed, such as portions of the bayonet connector openings 220a that are unobstructed by valve assembly 100a components.

In some embodiments, the valve assembly 100a has venting functionality that allows passive airflow along the airflow pathway 12a between the enclosure 232a and the outside environment 14a under normal pressure conditions. In the current example, the film 140a can be a venting material that is generally configured allow gases to passively vent through the airflow pathway 12a under normal pressure conditions. Upon a high-pressure event inside the housing 200a however, as discussed above, the valve assembly 100a is configured to allow gases to escape the housing 200a by bypassing the venting material.

In examples, the film 140a, which is a venting material, is coupled to the valve body 110a. The valve body 110a is generally configured to house the film 140a. The valve body 110a is configured to define an airflow pathway 12a from the valve opening 210a of the housing 200a to the outside environment 14a. The valve body 110a defines a cavity 124a, a first end 102a, a second end 104a, and a mating structure 116a. The valve body 110a can be constructed of a variety of materials and combinations of materials. In some embodiments the valve body 110a is constructed of plastic or metal. In one example, at least a portion of the valve body 110a is an injection-molded plastic. An end cap 114a is coupled to the valve body 110a towards the first end 102a. The end cap 114a can form a unitary component with the valve body 110a in some other embodiments. The cavity 124a is also defined by the end cap 114a.

The valve assembly 100a has a mounting surface 122a on which the film 140a is mounted. The mounting surface 122a is generally positioned between the first end 102a and the second end 104a within the cavity 124a. The valve sidewall 112a extends around the mounting surface 122a. The mounting surface 122a is generally configured to receive the film 140a. While the mounting surface 122a can be a single planar surface, in some other embodiments the mounting surface can be defined by multiple surfaces that are not necessarily planar. The mounting surface 122a defines a portion of the airflow pathway 12a. The mounting surface 122a extends around the airflow pathway 12a. The airflow pathway 12a can be defined by one or more openings 118a defined by the valve body 110a. In a variety of embodiments, the mounting surface 122a is a unitary structure with the valve body 110a. In some other embodiments, however, the mounting surface 122a is defined by a separate component that is coupled to the valve body 110a, either through a frictional fit or through the use of couplers such as screws.

The film 140a is coupled to the mounting surface 122a across the airflow pathway 12a. In some embodiments the film 140a is a venting material that is generally configured to allow passive airflow between the housing 200a and the ambient outside environment 14 while preventing liquids and particulates from entering into the housing 200a. In some other embodiments the film 140a is substantially impermeable. The film 140a is positioned in fluid communication with a valve opening 210a in the housing 200a (see FIG. 2). In the current example, the film 140a forms a circular disk, although the film 140a can have other shapes as well. The film 140a can be coupled to the mounting surface 122a with adhesive disposed adjacent to its outer perimeter 142a to form a seal between the film 140a and the mounting surface 122a. The film 140a can be coupled to the mounting surface 122a about its outer perimeter 142a with an adhesive or through other approaches such as heat welding. In some embodiments the valve body 110a can be over-molded to the film 140a.

The film 140a can be constructed of a variety of different materials and combinations of materials. In some embodiments the film 140a is a metal foil. The film 140a can be an elastomeric material such as latex. In various embodiments the film 140a incorporates a breathable membrane. The breathable membrane can incorporate expanded polytetrafluorethylene (ePTFE), sintered polytetrafluoroethylene (PTFE), or other types of breathable membranes. The breathable membrane is generally porous to accommodate airflow. The breathable membrane can have a Frazier Permeability of 0.035 to 8.0 ft/min at 0.5 inches of water, and more particularly 0.035 to 3.0 ft/min at 0.5 inches of water.

The film 140a can be a laminate or composite that includes a breathable membrane. For example, the film 140a can be a breathable membrane laminated to a woven or non-woven support layer. In another example, the film 140a can be a breathable membrane having a coating. In some other embodiments, the film 140a can be a breathable membrane alone, without another layer. In some embodiments, the film 140a is a woven fabric or a non-woven fabric. The film 140a can be constructed of hydrophobic material, or the film 140a can be treated to exhibit hydrophobic properties. In one example, the film 140a is a hydrophobic woven or non-woven fabric. In some embodiments the film 140a has a support ring to support the periphery of the film 140a that is coupled to the mounting surface 122a.

Figure 12:
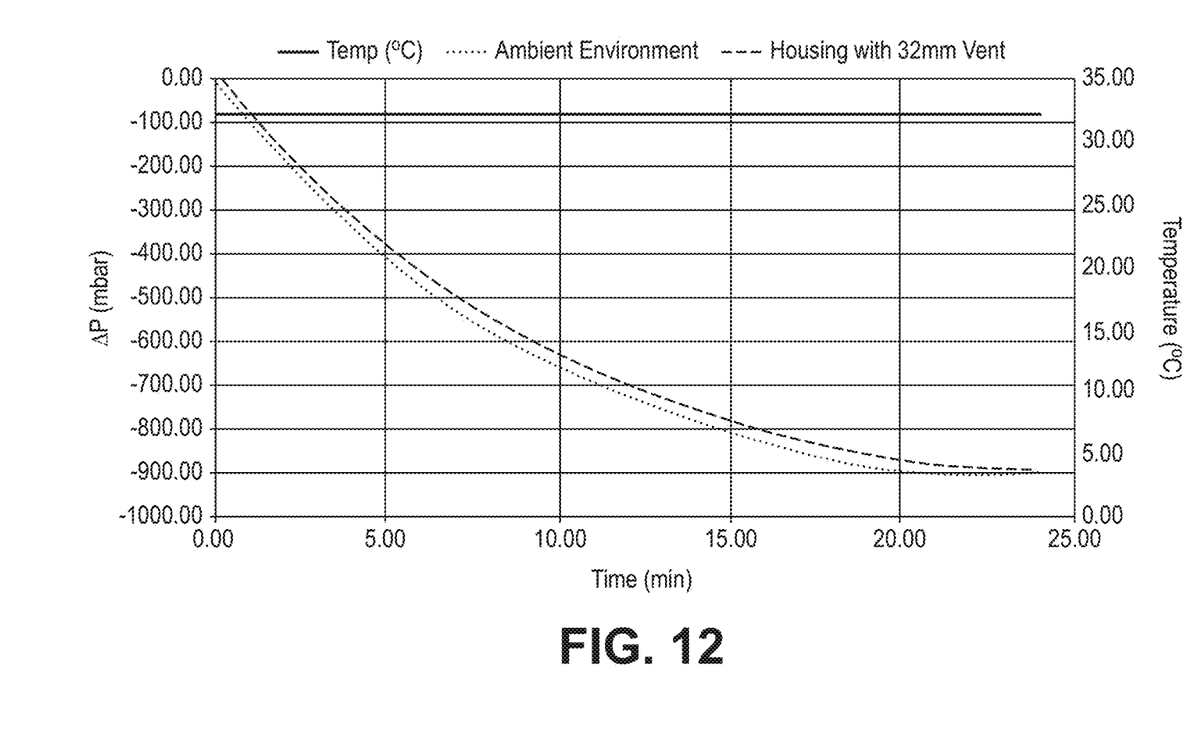
FIG. 12 is a graph showing a change in pressure of an ambient environment over time compared to a corresponding change in pressure within a housing over time, where the housing is in the ambient environment and has a venting material over a 32 mm-diameter opening in the housing.

FIG. 12 is a graph showing a change in pressure of an ambient environment over time compared to a corresponding change in pressure within a housing over time, where the housing is in the ambient environment and has a venting material over a 32 mm-diameter opening in the housing. The graph assumes a constant temperature. The graph can be consistent with changing the altitude of the housing at a constant speed. In this particular example, the venting material has a permeability of 0.13 ft/min at 0.5 inch water gauge. The maximum expected pressure difference between the ambient environment and the housing can be lower than the pressure difference required to open the valve assembly, in some embodiments. In FIG. 12, the maximum pressure difference between the ambient environment and the inside of the housing is about 24.89 mbar.

Returning to the example of FIGS. 2 and 4, the mating structure 116a is generally configured to couple the valve assembly 100a to a housing 200a about a valve opening 210a defined by the housing 200a. The mating structure 116a is defined towards the second end 104a of the valve body 110a. The mating structure 116a is generally configured to engage the housing 200a. In the current example, the mating structure 116a forms a bayonet connection with the housing 200a. In some alternate embodiments, the mating structure and the housing can define a snap-fit connection. In various examples, the valve coupling structure 220a is configured to sealably receive the mating structure 116a. In some embodiments, the mating structure 116a can define a screw thread configured to be received by a mating thread of the housing 200a about the valve opening 210a.

A seal 130a is compressed between the valve assembly 100a and the first sidewall 231a of the housing 200a around the valve opening 210a. The seal 130a is configured to create a seal between the valve assembly 100a and the housing 200a when the valve assembly 100a is coupled to the housing 200a. In embodiments consistent with the current example, the seal 130a is disposed around the mating structure 116a. The seal 130a can be an elastomeric material. In some embodiments the seal 130a is rubber or another gasketing or sealing material.

In examples consistent with the current embodiment, the valve body 110a defines an ambient-side opening 120a between the ambient outside environment 14 and the cavity 124a to define a first fluid flow pathway between the outside of the valve body 110a and the mounting surface 122a and/or the film 140a. The ambient-side opening 120a is defined by the valve sidewall 112a. In the current example, the ambient-side opening 120a is a series of openings defined through the valve sidewall 112a. Also, the mating structure 116a defines a second fluid flow pathway between the outside of the valve body 110a and the film 140a.

In examples consistent with the current embodiment, the valve body 110a defines a central axis X extending from the first end 102a to the second end 104a (shown in FIG. 5). The mounting surface 122a is about the central axis X. The valve sidewall 112a is about the central axis X.

Figure 3:
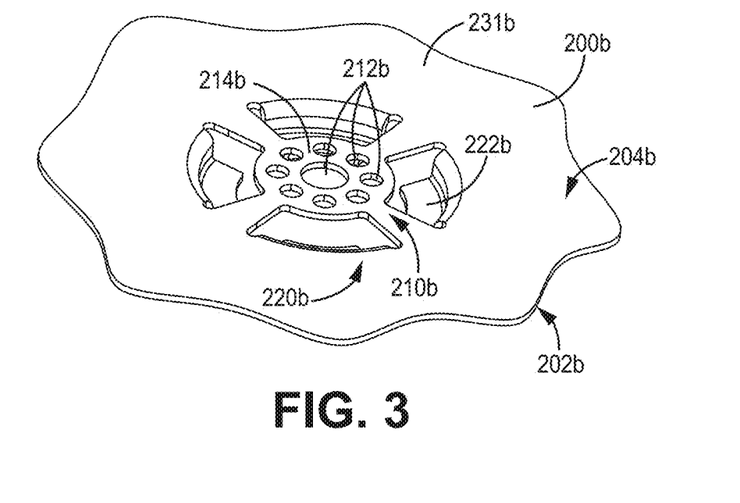
FIG. 3 is an alternate example housing consistent with FIG. 1.
Figure 7:
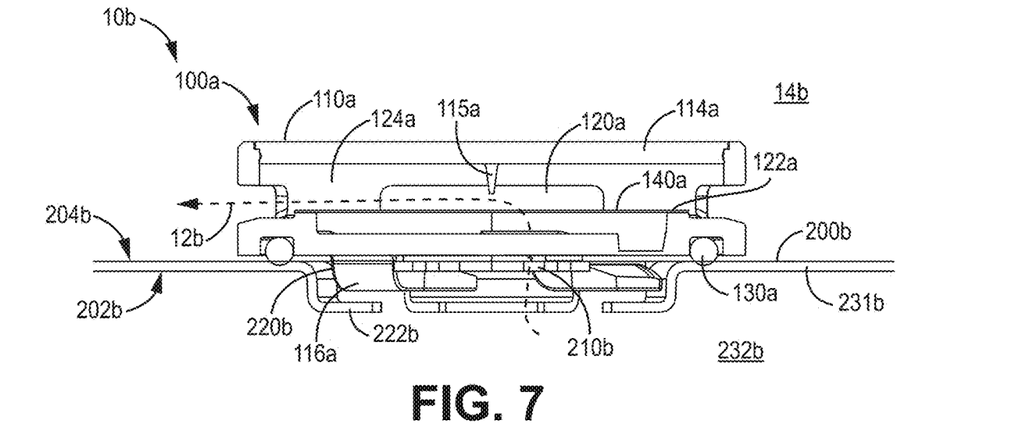
FIG. 7 is a cross-sectional view of a second example system consistent with FIG. 1.

FIG. 3 is an alternate example housing 200b that is also consistent with FIGS. 1 and 9. The housing 200b can be configured to be coupled to a valve assembly 100a that has already been discussed in detail above with reference to FIGS. 4 and 5. The cross-section of such a system 10b is depicted in FIG. 7. The system 10b is generally configured to allow gases to pass between the housing 200b and the outside environment 14b through a valve assembly 100a under normal operating conditions. The system 10b defines an airflow pathway 12b from the valve opening 210b of the housing 200b to the outside environment 14b through the valve assembly 100a.

As discussed above with reference to FIGS. 1 and 9, the valve assembly 100a is configured to couple to a first sidewall 231b of the plurality of sidewalls of the housing 200b, where the housing 200b is best visible in FIG. 3 for the present discussion. The housing 200b defines a plurality of openings 212b cumulatively defining a valve opening 210b. Having a valve opening 210b defined by a plurality of openings 212b allows the structure of the housing 200b itself to form a physical barrier 214b across the valve opening 210b. The physical barrier 214b can serve as a spark arrestor in some embodiments where the components within the housing can generate sparks. As such, the physical barrier 214b may reduce the likelihood of a spark reaching various components of the valve assembly 100a. The plurality of openings 212b can have configurations consistently with the discussions above.

The housing 200b defines a valve coupling structure 220b. The valve coupling structure 220b is generally configured to engage a valve assembly 100a. The valve coupling structure 220b is defined around the valve opening 210b of the housing 200b. In the current example, the valve coupling structure 220b is a plurality of bayonet connector openings around the valve opening 210b. Each bayonet connector opening extends entirely through the thickness of the first housing sidewall 231b. The first housing sidewall 231b defines a first face 202b within the enclosure 232b and a second face 204b outside of the enclosure 232b. The second face 204b is opposite the first face 202b. The valve coupling structure 220b extends through the first face 202b and the second face 204b. In this example, each bayonet connector opening is a radial segment of an annulus. The first housing sidewall 231b angularly separates each bayonet connector opening. The first housing sidewall 231b defines a shield 222b that at least partially obstructs each bayonet connector opening from the enclosure 232b.

Figure 8:
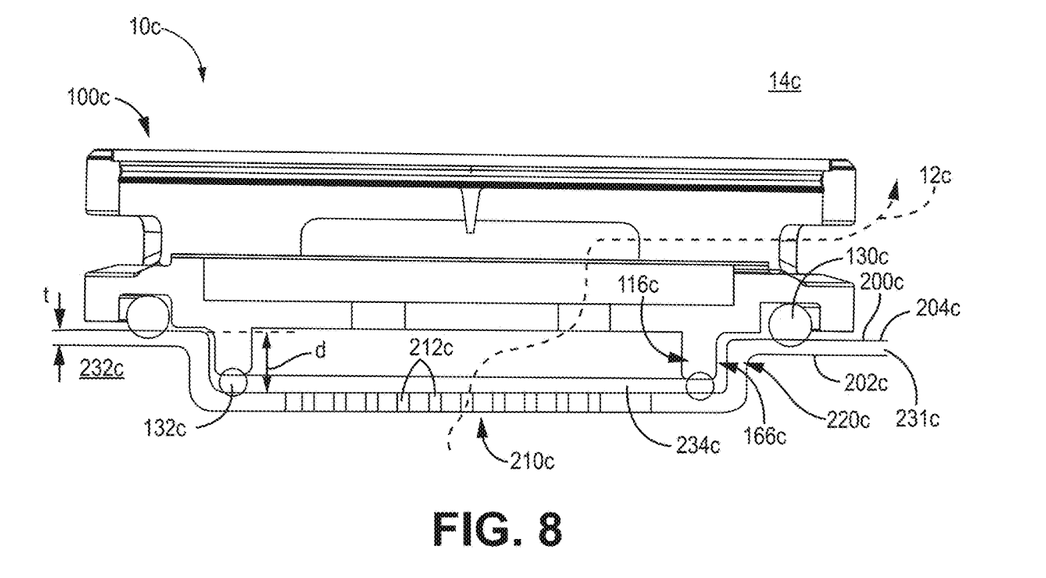
FIG. 8 is a cross-sectional schematic view of a third example system consistent with FIG. 1.

FIG. 8 is a cross-sectional schematic view of a third example system consistent with FIGS. 1 and 9. The current example is generally similar to examples discussed above with respect to FIGS. 2-7, except where contradictory to the present discussion and FIG. 8.

A first housing sidewall 231c of a housing 200b is configured to be coupled to a valve assembly 100c. The system 10c is generally configured to allow gases to pass between the enclosure 232c of the housing 200c and the outside environment 14c through the valve assembly 100c under normal operating conditions. The valve assembly 100a is configured to couple to a first sidewall 231c of the plurality of sidewalls of the housing 200c. The housing 200c defines a plurality of openings 212c cumulatively defining a valve opening 210c. Having a valve opening 210c defined by a plurality of openings 212c allows the structure of the housing 200c itself to form a physical barrier across the valve opening 210c, as discussed above.

The housing 200c defines a valve coupling structure 220c. The valve coupling structure 220c is generally configured to engage a mating structure 116c of the valve assembly 100c. In the current example, the valve coupling structure 220c and the mating structure 116c define a threaded connection. The valve coupling structure 220c is defined around the valve opening 210c of the housing 200c. In the current example, the valve coupling structure 220c is a screw thread defined by the first housing sidewall 231c around the valve opening 210c. Correspondingly, the mating structure 116c of the valve assembly 100c is a mating screw thread defined around the airflow pathway 12c. In the current example, the valve coupling structure 220c is an internal thread and the mating structure 166c of the valve assembly 100c is an external thread, although the opposite configuration is possible.

A first seal 130c is configured to be compressed between the valve assembly 100c and the first sidewall 231c of the housing 200c around the valve opening 210c. The first seal 130c is configured to create a seal between the valve assembly 100c and the housing 200c when the valve assembly 100c is coupled to the housing 200c. The first seal 130c is disposed around the mating structure 116c. The first seal 130c is disposed around the airflow pathway 12c. Additionally or alternatively, a second seal 132c is configured to be compressed between the valve assembly 100c and the first sidewall 231c of the housing 200c. In this example, the second seal 132c is an axial seal, but in some embodiments the second seal 132c can be a radial seal. The second seal 132c surrounds the valve opening 210c. The second seal 132c is disposed around the airflow pathway 12c. In this example the second seal 132c is not disposed around the mating structure 116c. The seals 130c, 132c can be constructed of materials that have been described above.

The valve coupling structure 220c extends no more than partially through the thickness of the first housing sidewall 231c. In particular, the first housing sidewall 231c defines a first face 202c within the enclosure 232c and a second face 204c outside of the enclosure 232c, where the second face 204c is opposite the first face 202c. The valve opening 210c is positioned between the first face 202c and the valve coupling structure 220c.

The first housing sidewall 231c forms a recess 234c having a depth d that is configured to receive the valve coupling structure 220c and the second seal 132c. In the current example the first sidewall 231c of the housing 200c has a relatively constant thickness t between the first face 202c and the second face 204c adjacent to the valve assembly 100c. In some alternate embodiments, a recess can be a blind hole formed in the second face towards the first face.

In such an example, the thickness of the housing surrounding the recess would be greater than the thickness of the housing at the recess.

Figure 10:
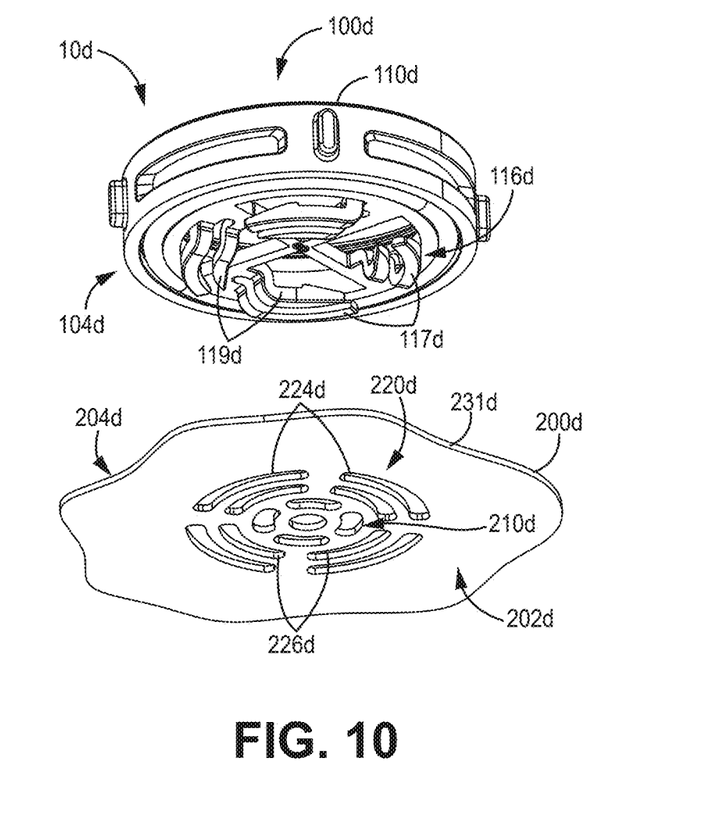
FIG. 10 is a perspective exploded view of a fourth example system consistent with FIG. 1.

FIG. 10 is an exploded view of a fourth example system 10*d* consistent with FIGS. 1 and 9. The disclosure of elements in the examples discussed above with respect to FIGS. 2-8 generally applies to corresponding elements discussed in reference to the current example, except where contradictory to the present discussion and FIG. 10.

In the current example, a valve coupling structure 220*d* is a plurality of bayonet connector openings around the valve opening 210*d*. Each bayonet connector opening extends entirely through the thickness of a first sidewall 231*d* of the housing 200*d*. The first housing sidewall 231*d* defines a first face 202*d* within the enclosure and a second face 204*d* outside of the enclosure 232*d*. The second face 204*d* is opposite the first face 202*d*. The valve coupling structure 220*d* extends through the first face 202*d* and the second face 204*d*. In this example, each bayonet connector opening is a radial segment of an annulus. An outer set of bayonet connector openings 224*d* form segments of an outer annulus and an inner set of bayonet connector openings 226*d* form segments of an inner annulus. The first housing sidewall 231*d* angularly and/or radially separates each bayonet connector opening.

The mating structure 116*d* is generally configured to couple the valve assembly 100*d* to a housing 200*d* about a valve opening 210*d* defined by the housing 200*d*. The mating structure 116*d* is defined towards the second end 104*d* of the valve body 110*d*. The mating structure 116*d* is generally configured to engage the housing 200*d*. In the current example, the mating structure 116*d* forms a bayonet connection with the housing 200*d*. A first set of bayonets 117*d* are radially spaced from a second set of bayonets 119*d*. The first set of bayonets 117*d* are configured to be received by the outer set of bayonet connector openings 224*d*. The second set of bayonets 119*d* are configured to be received by the inner set of bayonet connector openings 226*d*. In the current example, the bayonet connector openings are relatively narrow compared to previously-shown examples, which may advantageously limit the passage of particulates through the bayonet connection.

Statement of the Embodiments

Embodiment 1. A battery housing comprising:
a plurality of housing sidewalls defining an enclosure, wherein a first housing sidewall of the plurality of housing sidewalls defines a plurality of openings cumulatively defining a valve opening, wherein the first housing sidewall is constructed of metal; and
the first housing sidewall defining a valve coupling structure around the valve opening.

Embodiment 2. The battery housing of any one of embodiments 1 and 3-9, wherein the valve coupling structure comprises a plurality of bayonet connector openings around the valve opening.

Embodiment 3. The battery housing of any one of embodiments 1-2 and 4-9, wherein the valve coupling structure comprises an opening extending entirely through a thickness of the first housing sidewall.

Embodiment 4. The battery housing of any one of embodiments 1-3 and 5-9, wherein the coupling structure extends no more than partially through a thickness of the first housing sidewall.

Embodiment 5. The battery housing of any one of embodiments 1-4 and 6-9, wherein the first housing sidewall has a first face within the enclosure and a second face opposite the first face, wherein the second face is outside of the enclosure, and the valve opening is positioned between the first face and the coupling structure.

Embodiment 6. The battery housing of any one of embodiments 1-5 and 7-9, wherein the first housing sidewall has a first face within the enclosure and a second face opposite the first face, wherein the second face is outside of the enclosure, and each of the valve opening and the coupling structure extend through the first face and the second face.

Embodiment 7. The battery housing of any one of embodiments 1-6 and 8-9, wherein the valve coupling structure comprises a screw thread defined by the first housing sidewall around the valve opening.

Embodiment 8. The battery housing of any one of embodiments 1-7 and 9, wherein each of the plurality of openings have a maximum opening dimension of no more than 3 mm.

Embodiment 9. The battery housing of any one of embodiments 1-8, wherein the plurality of openings comprises at least 5 openings.

Embodiment 10. A vented system comprising:
a battery housing comprising a plurality of housing sidewalls defining an enclosure, wherein a first housing sidewall of the plurality of housing sidewalls defines a plurality of openings cumulatively defining a valve opening, and the housing further defining a coupling structure around the valve opening;
a valve comprising:
a valve body having a mating structure coupled to the coupling structure and the valve body defining an airflow pathway from the valve opening to an outside environment, and
a film coupled to the valve body, wherein the film is disposed across the airflow pathway; and
a seal compressed between the first housing sidewall and the valve body around the valve opening.

Embodiment 11. The vented system of any one of embodiments 10 and 12-18, wherein the seal is disposed around the mating structure.

Embodiment 12. The vented system of any one of embodiments 10-11 and 13-18, wherein the coupling structure and the mating structure define a threaded connection.

Embodiment 13. The vented system of any one of embodiments 10-12 and 14-18, wherein the coupling structure and the mating structure define a bayonet connection.

Embodiment 14. The vented system of any one of embodiments 10-13 and 15-18, wherein the valve body comprises a puncturing member extending towards the film.

Embodiment 15. The vented system of any one of embodiments 10-14 and 16-18, wherein the each of the plurality of openings have a maximum opening dimension of no more than 3 mm.

Embodiment 16. The vented system of any one of embodiments 10-15 and 17-18, wherein the wherein the valve coupling structure comprises a screw thread defined by the first housing sidewall around the valve opening.

Embodiment 17. The vented system of any one of embodiments 10-16 and 18, wherein the first housing sidewall has a first face within the enclosure and a second face opposite the first face, wherein the second face is outside of the enclosure, and the valve opening is positioned between the first face and the coupling structure.

Embodiment 18. The vented system of any one of embodiments 10-17, wherein the film is ePTFE.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A battery housing comprising:
   a plurality of housing sidewalls defining an enclosure, wherein a first housing sidewall of the plurality of housing sidewalls defines a plurality of openings cumulatively defining a valve opening, wherein the first housing sidewall is constructed of metal; and
   the first housing sidewall defining a valve coupling structure around the valve opening.

2. The battery housing of claim 1, wherein the valve coupling structure comprises a plurality of bayonet connector openings around the valve opening.

3. The battery housing of claim 1, wherein the valve coupling structure comprises an opening extending entirely through a thickness of the first housing sidewall.

4. The battery housing of claim 1, wherein the valve coupling structure extends no more than partially through a thickness of the first housing sidewall.

5. The battery housing of claim 1, wherein the first housing sidewall has a first face within the enclosure and a second face opposite the first face, wherein the second face is outside of the enclosure, and the valve opening is positioned between the first face and the valve coupling structure.

6. The battery housing of claim 1, wherein the first housing sidewall has a first face within the enclosure and a second face opposite the first face, wherein the second face is outside of the enclosure, and each of the valve opening and the valve coupling structure extend through the first face and the second face.

7. The battery housing of claim 1, wherein the valve coupling structure comprises a screw thread defined by the first housing sidewall around the valve opening.

8. The battery housing of claim 1, wherein each of the plurality of openings have a maximum opening dimension of no more than 3 mm.

9. The battery housing of claim 1, wherein the plurality of openings comprises at least 5 openings.

10. A vented system comprising:
    a battery housing comprising a plurality of housing sidewalls defining an enclosure, wherein a first housing sidewall of the plurality of housing sidewalls defines a plurality of openings cumulatively defining a valve opening, and the first housing sidewall further defining a valve coupling structure around the valve opening;
    a valve comprising:
       a valve body having a mating structure coupled to the valve coupling structure and the valve body defining an airflow pathway from the valve opening to an outside environment, and
       a film coupled to the valve body, wherein the film is disposed across the airflow pathway; and
    a seal compressed between the first housing sidewall and the valve body around the valve opening.

11. The vented system of claim 10, wherein the seal is disposed around the mating structure.

12. The vented system of claim 10, wherein the valve coupling structure and the mating structure define a threaded connection.

13. The vented system of claim 10, wherein the valve coupling structure and the mating structure define a bayonet connection.

14. The vented system of claim 10, wherein the valve body comprises a puncturing member extending towards the film.

15. The vented system of claim 10, wherein each of the plurality of openings have a maximum opening dimension of no more than 3 mm.

16. The vented system of claim 10, wherein the valve coupling structure comprises a screw thread defined by the first housing sidewall around the valve opening.

17. The vented system of claim 10, wherein the first housing sidewall has a first face within the enclosure and a second face opposite the first face, wherein the second face is outside of the enclosure, and the valve opening is positioned between the first face and the valve coupling structure.

18. The vented system of claim 10, wherein the film is ePTFE.

* * * * *